United States Patent

Bernard

[11] Patent Number: 6,056,325
[45] Date of Patent: May 2, 2000

[54] SWIVEL BODY FOR FLUID DRIVEN TORQUE WRENCHES

[75] Inventor: William P. Bernard, Waggaman, La.

[73] Assignee: Francis Torq/Lite, Harvey, La.

[21] Appl. No.: 09/067,252

[22] Filed: Apr. 27, 1998

[51] Int. Cl.[7] .................................................. F16L 35/00
[52] U.S. Cl. ............................ 285/39; 285/190; 285/276; 285/321
[58] Field of Search .................................. 285/190, 276, 285/321, 39

[56] References Cited

U.S. PATENT DOCUMENTS

| | | | |
|---|---|---|---|
| 2,459,643 | 1/1949 | Hartly | 289/190 |
| 2,786,698 | 3/1957 | Bard | 285/276 |
| 3,098,662 | 7/1963 | Iversen | 285/190 |
| 3,145,035 | 8/1964 | Hanback | 285/190 X |
| 3,627,355 | 12/1971 | Reddy | 285/190 |
| 3,973,790 | 8/1976 | Wenzel | 285/190 X |
| 4,142,741 | 3/1979 | Fiala | 285/190 |
| 5,097,730 | 3/1992 | Bernard et al. | 81/57.39 |
| 5,607,189 | 3/1997 | Howeth | 285/190 |

FOREIGN PATENT DOCUMENTS

| | | | |
|---|---|---|---|
| 1121046 | 7/1956 | France | 285/321 |
| 1918012 | 12/1970 | Germany | 285/190 |

*Primary Examiner*—Dave W. Arola
*Attorney, Agent, or Firm*—Garvey, Smith, Nehrbass & Doody, LLC

[57] ABSTRACT

An improved ratcheting tool swivel body assembly which would include a swivel body having a principal body portion, and a threaded port extending outward from the wall of the stem body, the stem body would further include a continuous opening therethrough, for receiving an elongated stem member, the stem member including a port through the stem member, for allowing fluid to flow between the port and the stem member and the threaded port of the swivel body. The stem member would include a first end having a threaded male end for threadably engaging to the hydraulic fluid source of the torque wrench, and a second end terminating in a hex head portion which is engaged against the upper end of the swivel body. The stem member would be maintained in position through the use of a retainer ring adjacent the lower threaded end of the stem body and rests along a angular surface of the swivel body so that should inordinate pressure be placed on the swivel assembly or it comes into contact with a blunt force, the retainer ring is maintained in position against the angulated surface which prevents disengagement of the stem member from the swivel assembly body.

10 Claims, 3 Drawing Sheets

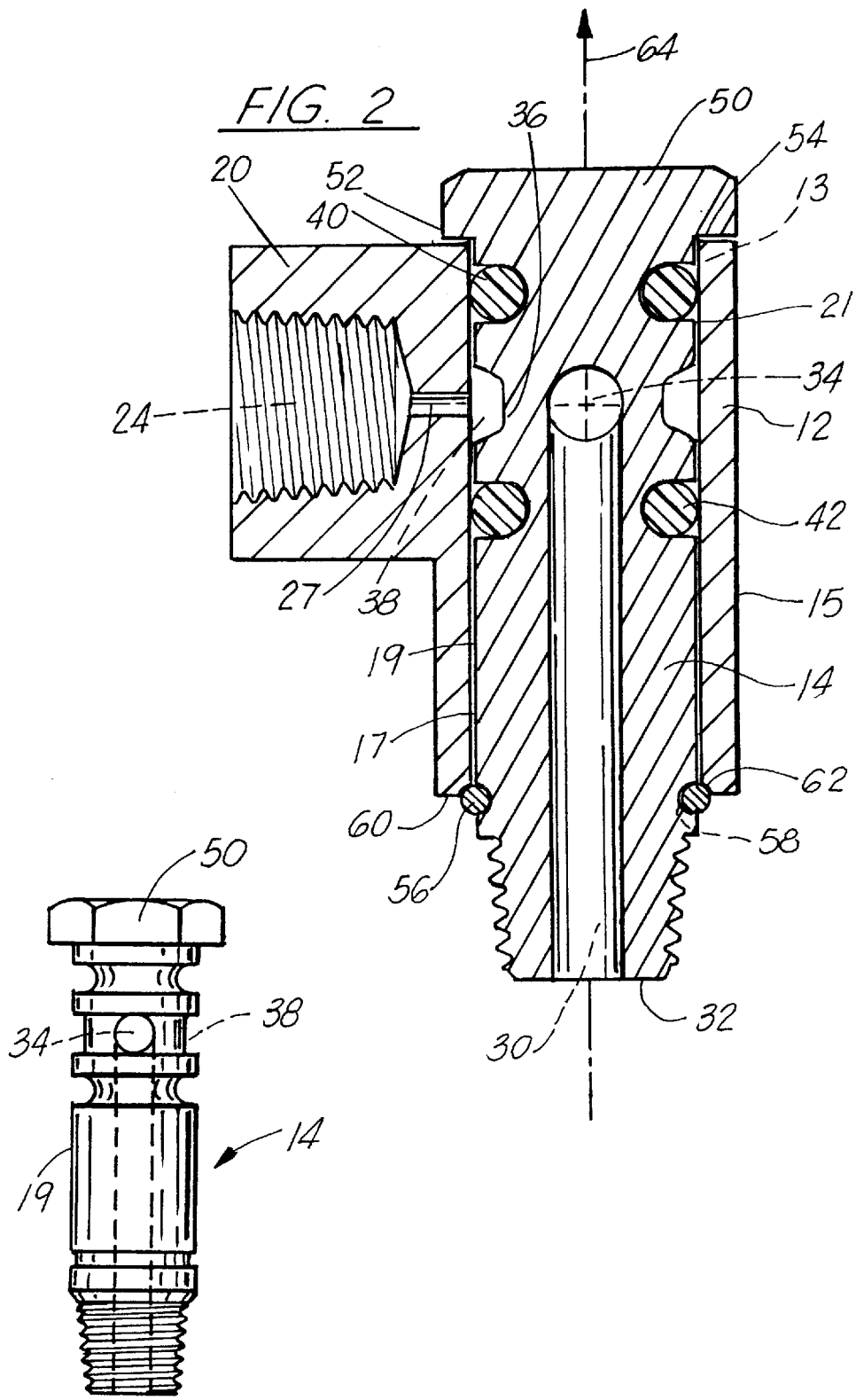

SWIVEL BODY FOR FLUID DRIVEN TORQUE WRENCHES

BACKGROUND OF THE INVENTION

1. Field of the Invention

The apparatus of the present invention relates to torque wrenches. More particularly, the present invention relates to an improved swivel body for allowing an inline ratcheting tool to swivel in a 365 degree path while providing increased stability to the assembly to prevent failure of the assembly during high pressure conditions.

2. General Background of the Invention

In the use of inline ratcheting tools, of the type, for example found in U.S. Pat. No. 5,097,730, include hydraulically controlled torque wrenches where there is incorporated a standard wrench body which is connected to a reciprocating power head, with the power head being operated through a hydraulic cylinder which receives hydraulic fluid from a source. When such wrenches are placed in use, because of the nature of the operation that these wrenches undertake, it is often desirable that the wrench have the ability to be engaged to the source of hydraulic fluid through the use of a swivel body, where the wrench can be moved in a 360 degree path, in order to facilitate its use on the job site.

Such swivel bodies are commonly known, and usually include a swivel body which accommodates a stem member through the body, with the stem member having a port through the stem, with one end of the stem threadably engaged to the source of hydraulic fluid. The swivel body would include a threaded port extending out from the swivel body, which would threadably engage onto the hydraulic line of the wrench, with the stem member and the body being sealed in such a manner that fluid passing through the stem would be routed into the arm of the stem body for activating the wrench.

One of the shortcomings that is encountered in such a swivel body currently known in the art is the fact that the stem member which has been inserted into the swivel body is normally held in place by a retainer ring on the second end of the stem member which has been forcibly engaged into a slot in the wall of the stem, to maintain it in place while it is engaged on the swivel body during use. However, it has been common that under high pressure conditions, should the retainer ring undergo blunt contact, the retainer ring may be disengaged from the assembly body, and the stem may dislodge from the body and accidents could occur from that occurrence. Therefore, there is a need in the industry for an improved swivel body assembly which would provide that under no conditions once the stem member is engaged within the stem body that the stem is maintained within the stem body and inadvertent dislodging of the stem body from the assembly body does not occur.

BRIEF SUMMARY OF THE INVENTION

The apparatus of the present invention solves the shortcomings in the art in a simple and straight forward manner. What is provided is an improved ratcheting tool swivel body assembly which would include a swivel body having a principal body portion, and a threaded port extending transversely outward from the wall of the stem body. The stem body would further include a continuous bore therethrough, for receiving an elongated stem member, the stem member including a bore through the stem member, for allowing fluid to flow between the bore in the stem member and the threaded port of the swivel body. The stem member would include a first end having a threaded male end for threadably engaging to the hydraulic fluid source of the torque wrench, and a second end terminating in a hex head portion which is engaged against the upper end of the swivel body. The stem member would be maintained in position through the use of a retainer ring adjacent the lower threaded end of the stem body and rests along a angular surface of the swivel body so that should inordinate pressure be placed on the swivel assembly, or if it comes into contact with a blunt force, the retainer or snap ring is maintained in position against the angulated surface which prevents disengagement of the stem member from the swivel assembly body.

Therefore, it is the principal object of the present invention to provide an improved swivel body assembly for inline ratcheting tools, which when fully assembled, a stem portion of the assembly is prevented from inadvertently disengaging from the swivel body portion;

It is a further object of the present invention to provide an improved swivel assembly for a ratcheting tool which incorporates an integral hex head portion on a first end of the stem body and a retainer ring recessed against an angular surface on a second end of the stem body for maintaining the stem body engaged into the swivel body portion;

It is a further object of the present invention to provide an improved swivel body assembly for ratcheting tools which provides additional safety and greatly reduces the chances of the stem member becoming disengaged from the swivel body under adverse or high pressure conditions.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein:

FIG. 2 is a cross section view thereof;

FIG. 4 is a side view of the stem member of the preferred embodiment of the apparatus of the present invention.

DETAILED DESCRIPTION OF THE INVENTION

Figure 1:
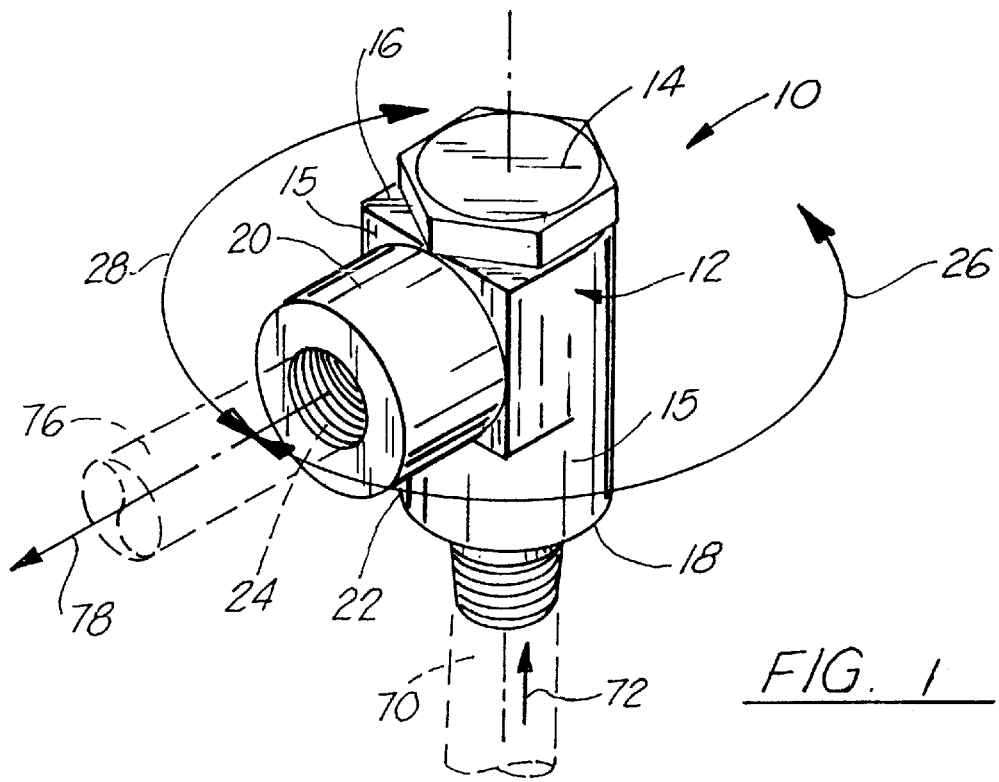
FIG. 1 is an overall perspective view of the preferred embodiment of the apparatus of the present invention.
Figures 5A, 5B:
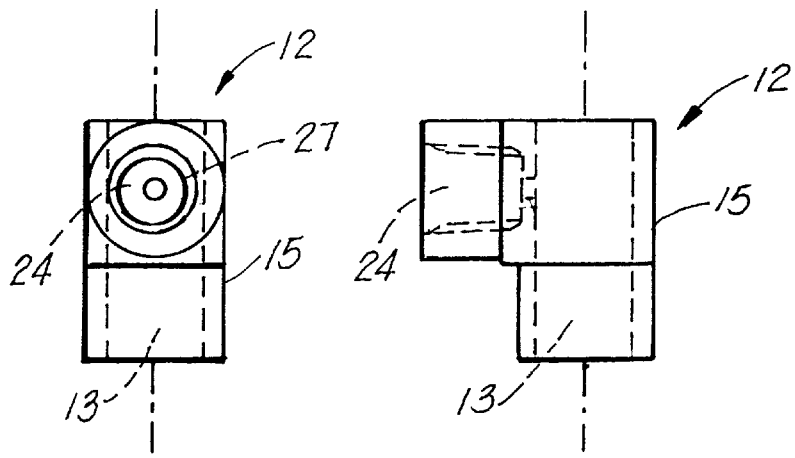
FIGS. 5A–5C are front, side and top views respectively of the body portion of the preferred embodiment of the apparatus of the present invention.
Figure 5C:
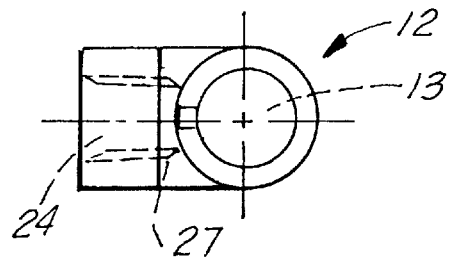
Figure 3:
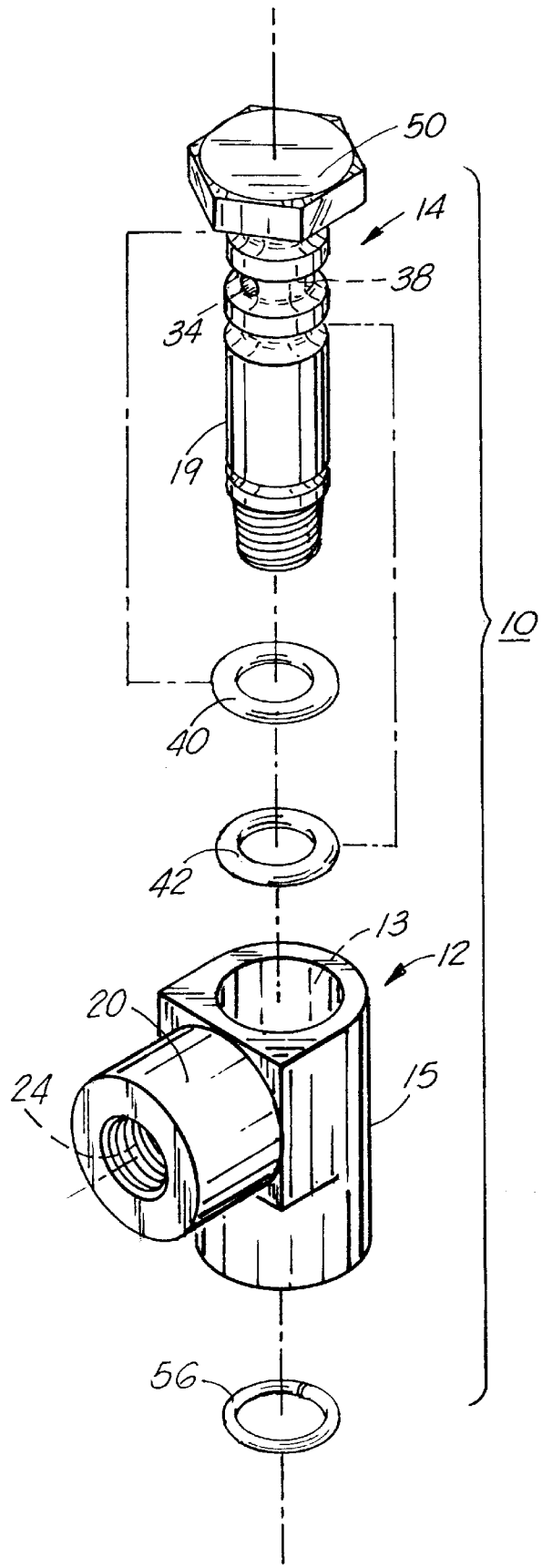
FIG. 3 is an exploded view of the preferred embodiment of the apparatus of the present invention.

FIGS. 1–5C illustrate the preferred embodiment of the apparatus of the present invention by the numeral 10, as illustrated more particularly in overall view in FIG. 1 and exploded view in FIG. 3. As illustrated, there is seen the improved swivel body assembly 10 which includes a principal body portion 12, and a stem member 14 engaged within body portion 12. Body portion 12 includes a continuous substantially circular side wall 15 terminating in an upper face 16 and a lower face 18. The body assembly 12 further includes an internally threaded arm portion 20 extending from a portion of the side wall 14 and including a circular outer wall 22 and a threaded bore 24, the function of which will be described further. As illustrated, in FIG. 1, the stem member 14 has been slidably engaged within a port (not illustrated) in body portion 12 and the body portion 12 has the ability to rotate in a 360 degree angle relative to the position of stem member 14 as seen by arrows 26 and 28.

As seen more clearly in FIGS. 2 and 3, again there is illustrated the body portion 12 having its continuous wall 15 and illustrating in that view in FIG. 2, the fact that body portion 12 has a continuous port 13 therethrough for accommodating the stem member 14. The stem member 14 has been slidably engaged within the port 13 of body portion 12, having a slight clearance 17 between the wall 19 of stem member 14 and the inner surface 21 of body portion 12. As further illustrated in FIG. 2, the stem member 14 includes a port 30 which extends from its lower end 32 through the central portion of the stem 14 and terminates in a transverse bore 34 throughout the stem body 14 as illustrated in FIG. 4. As further illustrated in FIGS. 2 and 3, the body portion 12 includes the threaded port section 20 as was described earlier having the threaded port 24 therethrough, with the threaded port therethrough having a reduced bore 27 making contact with the inner bore 13 of body portion 12. As is noted at the point where port 27 extends into bore 13, there is a reduced neck 36 of stem member 14, which would define a circular fluid flow area 38 between the neck 36 of stem 14 and the inner surface 21 of body portion 12.

It is further noted in FIG. 2, that the transverse bore 34 through stem member 14 is in line with the port 27 from threaded port 24 of arm 20 so that fluid flow may flow from the bore 30 in stem member 14 into transverse bore 34 and through the threaded bore 24 of arm 20 into a fluid line. Further illustrated in FIG. 2 is the fact that there is included upper O ring 40 and lower O ring 42, which are positioned above and below the transverse bore 34 and stem members 14 so as to prevent any fluid flow flowing through bore 30 and into bore 27 from escaping between the side wall 19 of stem portion 14 and the wall 21 of body portion 12. As is seen in FIG. 2, stem member 14 has been fully engaged within port 13 of body portion 12, and includes an integral top hex portion 50 which includes a continuous shoulder portion 52 which engages against the upper wall 54 of body portion 12. On its lower end there is included a snap ring 56 which is seen in FIGS. 2 and 3, which engages into a continuous recess 58 within the wall of stem member 14 wherein the ring 56 is engaged to maintain the stem member 14 in position as seen in FIG. 2. It should be further noted that the lower end 60 of the body portion 14 includes an angulated surface 62 which preferably would be approximately a 42 degree angle so that as ring 56 is within recess 58, should there be force against the stem member 14 in the direction of arrow 64, the ring 56 will in effect be held in place between the wall of the recess 58 and the angulated surface 62 in body portion 12.

In effect, with the hex cap 50 being integral to the body portion of stem 14, it is firmly held in place along the upper edge 16 of body portion 12, and in combination with the retainer ring 56 on its lower end, there is little or no possibility for the stem member becoming disengaged from the body portion 12 under high pressure conditions. Therefore, during use, as illustrated particularly in FIG. 1, a first fluid line 70, as seen in phantom view, would deliver fluid under pressure in the direction of arrow 72 through the bore 30 in stem member 14, then into the transverse bore 34 of stem member 14, wherein the fluid would enter the annular space 38 and would then flow into reduced bore 27 and threaded bore 24 of the swivel body 12, and would then exit second fluid flow line 76 in the direction of arrow 78 to provide fluid flow into the torque wrench at the second end of fluid flow line 76.

The foregoing embodiments are presented by way of example only; the scope of the present invention is to be limited only by the following claims.

I claim:

1. An improved swivel assembly for a torque wrench, comprising:
   a. a swivel body having a substantially smooth first bore therethrough;
   b. a stem member slidably engaged in the first bore of the swivel body, further comprising an upper end cap portion with outer dimension larger than the first bore of the swivel body and engaged against the swivel body, and a second threaded end portion extending from the first bore of the swivel body, and a first bore through a portion of the stem member and a second bore through the stem member traverse to and communicating with the first bore through a portion of the stem member;
   c. a second bore in the wall of the swivel body, traverse to the first bore of the swivel body and communicating with the second bore in the stem member;
   d. a snap ring with a substantially circular cross section positionable in a continuous recess around the second threaded end of the stem member seating partially inside the continuous recess and extending partially outside thereby blocking downward movement of the swivel body, for engaging the stem member in the swivel body to provide rotational movement of the stem member relative to the swivel body.

2. The improved swivel assembly in claim 1, further comprising a first fluid line engageable onto the second end of the stem member and a second fluid line engageable in the second bore in the wall of the swivel body to provide fluid flow between the first and second fluid lines through the swivel assembly.

3. The improved swivel assembly in claim 1, further comprising O-rings to isolate the fluid flow from the second bore through the stem member to the second bore in the wall of the swivel body.

4. The improved swivel assembly in claim 1, further comprising an inwardly angulated surface in the lower end of the swivel body for contacting the surface of the snap ring to maintain the ring positioned around the stem member under high pressure or adverse conditions.

5. The improved swivel assembly in claim 1, wherein the upper end cap portion of the stem member further comprises a hex head of the stem member to help secure the stem member engaged in the first bore of the swivel body.

6. An improved swivel assembly for a torque wrench, comprising:
   a. a swivel body having a substantially smooth first bore therethrough;
   b. a stem member slidably engaged in the first bore of the swivel body, further comprising an upper end cap portion with outer dimension larger than the first bore of the swivel body and engaged against the swivel body, and a second threaded end portion extending from the first bore of the swivel body, and a first bore through a portion of the stem member and a second bore through the stem member traverse to and communicating with the first bore through a portion of the stem member;
   c. a second bore in the wall of the swivel body, traverse to the first bore of the swivel body and communicating with the second bore in the stem member;
   d. a snap ring with a substantially circular cross section positionable in a continuous recess around the second threaded end of the stem member seating partially inside the continuous recess and extending partially outside thereby blocking downward movement of the swivel body, for engaging the stem member in the swivel body to provide rotational movement of the stem member relative to the swivel body; and e. an inwardly angulated surface in a lower end of the swivel body for contacting the surface of the snap ring positioned in the recess around the second threaded end of the stem member to maintain the ring positioned around the stem member under high pressure or adverse conditions.

7. An improved swivel assembly for a torque wrench, comprising:

a. a fluid source having a first fluid line;

b. a torque wrench, having a second line for receiving fluid from the fluid source;

c. a swivel assembly, positionable between the first fluid line and the second fluid line, the swivel assembly comprising:

i. a swivel body having a substantially smooth first bore therethrough;

ii. a stem member slidably engaged in the first bore of the swivel body, further comprising an upper end cap portion with outer dimension larger than the first bore of the swivel body and engaged against the swivel body, and a second threaded end portion extending from the first bore of the swivel body for receiving the first fluid line, and including a first bore through a portion of the stem member for receiving fluid flow from the first fluid line and a second bore through the stem member traverse to and communicating with the first bore through a portion of the stem member;

iii. a second bore in the wall of the swivel body, traverse to the first bore of the swivel body and communicating with the second bore in the stem member, the second bore in the wall of the swivel body receiving the second fluid line;

iv. a snap ring with a substantially circular cross section positionable in a continuous recess around the second threaded end of the stem member seating partially inside the continuous recess and extending partially outside thereby blocking downward movement of the swivel body, for engaging the stem member in the swivel body to provide rotational movement of the stem member relative to the swivel body as fluid flows from the first fluid line, through the first and second bores in the stem member to the first and second bores of the swivel body, and into the torque wrench.

8. The improved swivel assembly in claim 7, further comprising an inwardly angulated surface in a lower end of the swivel body for contacting the surface of the snap ring to maintain the ring positioned around the stem member under high pressure or adverse conditions.

9. The improved swivel assembly in claim 7, further comprising O-rings positioned between the wall of the swivel body and the wall of the stem member, above and below the second bore through the stem member and the second bore of the swivel body, to isolate the fluid flow from the first bore through a portion of the stem member to the second bore of the swivel body.

10. The improved swivel assembly in claim 7, wherein the upper end cap portion of the stem member further comprises a hex head of the stem member to help secure the stem member engaged in the first bore of the swivel body.

* * * * *